United States Patent [19]

Knapp

[11] 4,041,703

[45] Aug. 16, 1977

[54] HYDROSTATIC TRANSMISSION WITH INTEGRAL AUXILIARY PUMP

[75] Inventor: Kenneth K. Knapp, Battle Creek, Mich.

[73] Assignee: Eaton Corporation, Cleveland, Ohio

[21] Appl. No.: 689,283

[22] Filed: May 24, 1976

[51] Int. Cl.² ............... F16H 39/46; F15B 15/18
[52] U.S. Cl. .......................... 60/464; 60/465; 60/468; 60/486; 60/DIG. 10; 417/216
[58] Field of Search ............... 60/443, 444, 447, 464, 60/465, 468, 486, 488, 494, DIG. 10, 484, 485; 417/216

[56] References Cited

U.S. PATENT DOCUMENTS

| 2,560,283 | 7/1951 | Giesey | 417/216 X |
| 2,938,347 | 5/1960 | Sturgis | 60/DIG. 10 |
| 2,942,581 | 6/1960 | Gaffney | 60/DIG. 10 |
| 3,672,166 | 6/1972 | Isaac | 60/468 X |
| 3,708,978 | 1/1973 | Reiff et al. | 60/443 |

*Primary Examiner*—Edgar W. Geoghegan
*Attorney, Agent, or Firm*—Teagno & Toddy

[57] ABSTRACT

A hydrostatic transmission is disclosed which includes a pump assembly in which a main pump, a charge pump, and an auxiliary pump are commonly housed and are drivingly connected to a single shaft assembly. An external fluid connection is provided through which fluid is directed from the auxiliary pump to a power take off, and valving is provided to short circuit the auxiliary pump when power is not demanded. Means of controlling the rate of operation of the valve are also provided to prevent excessive pressure rise rates at the outlet of the auxiliary pump upon actuation of the valving.

15 Claims, 3 Drawing Figures

HYDROSTATIC TRANSMISSION WITH INTEGRAL AUXILIARY PUMP

BACKGROUND OF THE INVENTION

1. Field of the Invention

The present invention relates generally to hydrostatic transmission systems and more particularly to pumps employed in such systems.

2. Description of the Prior Art

Hydrostatic transmissions are often utilized in applications in which there are power using functions to perform other than that which is accomplished by the transmission itself. One example may be seen in the design of transit mixer trucks in which the concrete mixing drum is driven by the truck engine through a hydrostatic transmission. Certain other auxiliary truck operating functions, such as the deployment of the concrete distribution chute, also may be well performed through the use of fluid power. It has heretofore been necessary, however, to provide a separate fluid power system to accomplish such functions. These systems disadvantageously include a separate pump with associated drive, cooling, and control means which increase the total cost and add to the complexity of supplying fluid power for a given application.

SUMMARY OF THE INVENTION

Responsive to the disadvantages of prior art hydrostatic transmission systems, it is an object of the present invention to provide a hydrostatic transmission operative to provide fluid power for auxiliary drive functions.

It is another object to fluidly integrate the system for providing the auxiliary fluid power with the hydrostatic transmission system.

According to one feature of the present invention, a hydrostatic transmission is provided which employs a main variable displacement pump driven by a shaft assembly which is further drivingly connected to a charge pump and an auxiliary pump, both of which are commonly housed with the main pump.

According to another feature of the invention, valve means are housed with the auxiliary pump to selectively extract power from the shaft assembly for auxiliary drive functions.

BRIEF DESCRIPTION OF THE DRAWINGS

These and other objects and features will become obvious to those skilled in the hydraulic arts upon reading the following description of the preferred embodiment with reference to the attached drawings wherein.

DESCRIPTION OF THE PREFERRED EMBODIMENT

Figure 1:
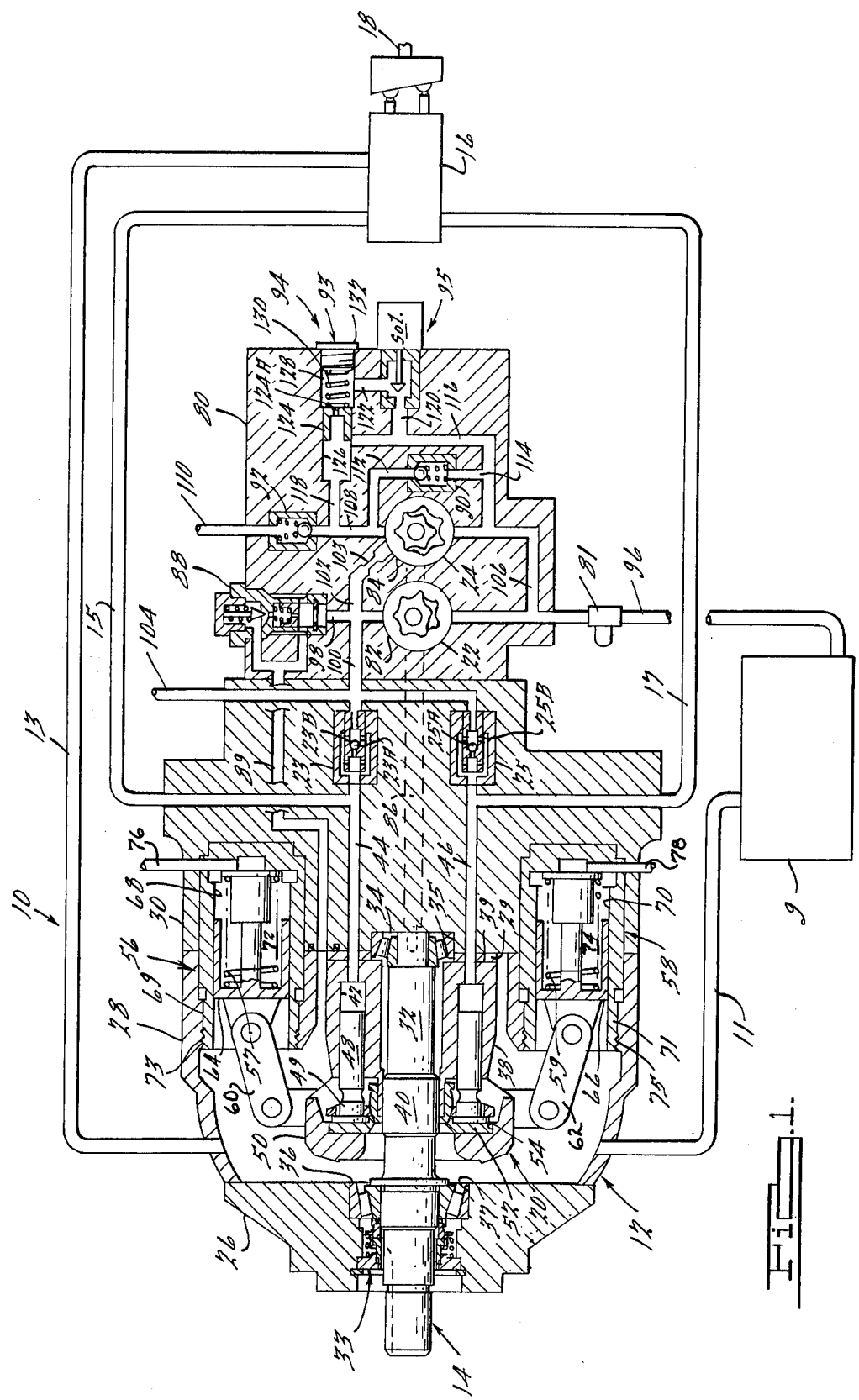
FIG. 1 is a diagrammatic view of a hydrostatic transmission according to the present invention.

Referring first to FIG. 1, a hydrostatic transmission system 10 is illustrated diagrammatically as including a variable displacement pump assembly 12, driven by a prime mover such as a truck engine (not shown) through a shaft assembly 14, and fluidly connected to a fixed displacement motor 16 which is drivingly connected to a load such as the drum of a transit mixer (not shown) through a shaft 18. It will be appreciated by those skilled in the art of hydrostatic transmissions as the description proceeds that other configurations of pumps and motors than those herein described may be utilized without departing from the teaching of the present invention. The configuration of the FIG. 1 embodiment is intended to be merely illustrative of a system utilizing the teaching of the present invention in the environment of an equipment drive system for a transit mixer truck.

Considering the pump assembly 12 now in more detail, it is illustrated as including a main variable displacement pump subassembly 20, a replenishing and cooling or charge pump subassembly 22, and an auxiliary pump subassembly 24. A mounting flange housing 26, a main housing 28, and a valve block housing 30, are joined to each other by suitable fasteners (not shown) and fluidly sealed by known static sealing means. A main shaft element 32 of the shaft assembly 14 is simply supported for rotation within the housings by front and rear bearings 34 and 36, respectively.

The bearing 34 is supported in a centrally located bore 35 formed in the valve block housing 30. The bearing 36 is similarly supported in a centrally located bore 37 formed in the mounting flange housing 26. The main shaft portion 32 is drivingly connected to a cylinder barrel 38 through a spline 40 or similar connection. The cylinder barrel 38 includes a plurality of axially extending bores 42 spaced radially outwardly from the axis of rotation thereof. A front face 39 of the cylinder barrel 38 is hydraulically and mechanically urged into sliding engagement with a stationary valve plate 29 to effect a dynamic seal. Fluid communication between the bores 42 and the valve block 30 is accomplished through this joint face as indicated schematically by the passages 44 and 46. Bores 42 are sized to slidingly receive a plurality of pistons 48, which include pivotally mounted slipper portions 49. Pistons 48 are axially retained in a swash plate 50 in known manner. The swash plate 50 is pivotally mounted for movement about an axis substantially perpendicular to the axis of rotation of the shaft assembly 14 in a known manner. Reciprocal movement of the pistons 48 is effected by pivotal displacement of the swash plate 50, and the axial reaction to the piston forces created through consequent pressurization of the bores 42 is taken on a bearing plate 52 carried in a slot 54 formed in the swash plate 50. In the preferred embodiment shown in FIG. 1, the pivotal displacement of the swash plate is effected through a pair of control cylinder assemblies 56, 58 which are connected to the swash plate 50 through pivotally mounted arms 60, 62, respectively. Each control cylinder assembly 56, 58 comprises a single acting piston 64, 66 slideably received in a bore 68, 70 formed in a sleeve 69, 71 threadedly carried by the main housing 28 as indicated at 73, 75 and defining a control pressure cavity 72, 74 which is in fluid communication through a conduit 76, 78 with a suitable displacement control (not shown). A pair of springs 57, 59 disposed between the pistons 64, 66 and a portion of the sleeves 69, 71 center the swash plate 50 at a zero displacement position, as shown, in the absence of the difference in control pressure between the cavities 72 and 74.

Also drivingly connected to the main shaft portion 32 is shaft seal 33 of a known design whereby a dynamic fluid seal is provided between the shaft portion 32 and the mounting flange housing 26.

The passages 44 and 46 are fluidly communicated with the motor 16 through branch conduits 15 and 17. The conduits 44 and 46 are also in fluid communication with the charge pump of assembly 22 through a pair of check valves 23, 25.

Provision for leakage flow from the pump 12 and the motor 16 is effected by use of a conduit 13 interconnecting the motor and pump cases and the conduit 11 interconnecting the pump case and a reservoir 9.

The charge pump of assembly 22 and the auxiliary pump of assembly 24 are commonly housed in a dual element pump housing 80 secured to the valve block housing 30 of the main pump assembly 20, a specific embodiment which is to be described in more detail below.

The housing 80 includes a charge pump element 82 and an auxiliary pump element 84 carried on an auxiliary shaft portion 86 drivingly connected to the main shaft portion 32 of the shaft assembly 14. Also carried in the housing 80 is a charge pump relief valve 88, an auxiliary pump relief valve 90, an auxiliary pump check valve 92, and a solenoid operated bypass valve 94. The inlet of the charge pump element 82 is in fluid communication with a fluid reservoir 9 through a suitable fluid filter 81 in a suction conduit 96. The outlet of the charge pump element 82 is directed to a discharge passage 98 communicating with the charge pump relief valve 88. Branch passages 100, 102 port fluid from the discharge passage 98, respectively to a control pressure passage 104 and to the outer periphery of the auxiliary pump element 84, which is herein illustrated as a gerotor-type pumping element. An orifice 103 is included in the branch conduit 102.

Control pressure passage 104 is in fluid communication with the check valves 23, 25 to maintain the inlet pressure of the main pump assembly 20 in a manner well known in the art. The passage 104 is also fluidly connected to the known displacement control to supply fluid thereto at a pressure limited by the relief valve 88, which is connected by a drain passage 89 to the interior of the main housing 28.

The inlet of the auxiliary pump element 84 is fluidly connected by a conduit 106 with the inlet conduit 96 of the charge pump element 82. While it is here illustrated as accomplishing this connection within the housing 80, it will be clear to those skilled in the art that an external equivalent connection could be made. The outlet of the auxiliary pump element 84 is connected to a conduit 108 which is connected in series to the check valve 92 through which fluid is directed through a discharge conduit 110 to an auxiliary motor (not shown). Connected in parallel with the auxiliary pump element 84 across the inlet and outlet passages 106 and 108 are the relief valve 90 and the bypass valve 94. The relief valve 90 is fluidly connected to the outlet passage 108 through a passage 112 and is operative to port fluid from that passage to the inlet passage 106 through passage 114. The bypass valve 94 is fluidly connected to the outlet passage 108 through a passage 118 and to the inlet passage 106 through the passage 116.

The bypass valve 94 includes a fluid directing portion 93 and a solenoid operated pilot portion 95. Pilot portion 95 is connected to the passage 116 through a passage 120 and to the fluid directing portion 93 through a passage 122. Fluid directing portion 93 is diagrammatically illustrated in FIG. 1 as including a spool piston 124, slideably received in a bore 126 and biased to the leftward position in FIG. 1 by a spring 130 retained by a threaded plug 132 in a chamber 128. Pilot portion 95 is illustrated as a normally open solenoid operated pilot valve.

Figure 2:
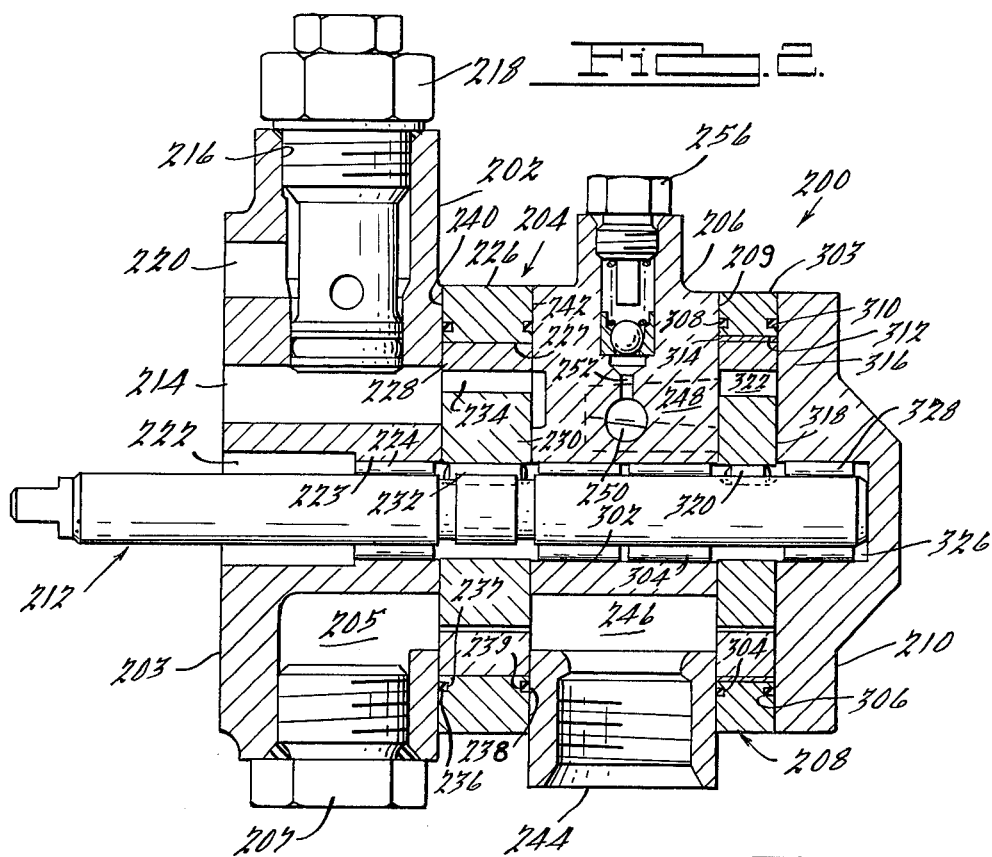
FIG. 2 is a cross-sectional view of a portion of the pump assembly of the present invention including the auxiliary pumping element.
Figure 3:
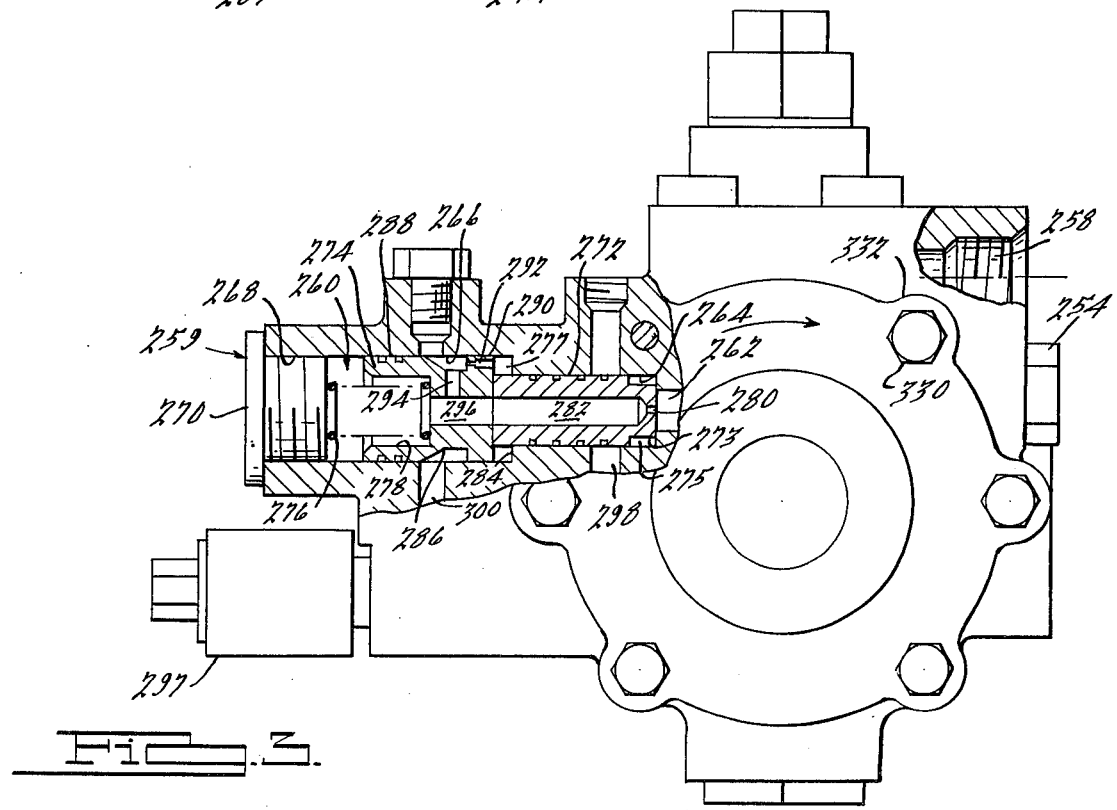
FIG. 3 is a partially sectioned end view of the portion of FIG. 2 illustrating the auxiliary pump bypass valve.

Before proceeding with an operational description of the invention transmission pump, attention is directed to FIGS. 2 and 3 in which a preferred embodiment of the charge and auxiliary pumps is illustrated in greater detail than that provided in the diagrammatic view of FIG. 1.

A dual element pump assembly 200 is illustrated as including a charge pump valve housing 202, a gerotor-type charge pump element 204, an auxiliary pump valve housing 206, a gerotor-type auxiliary pump element 208, an end cover 210, and an auxiliary shaft assembly 212.

The charge pump valve housing 202 is adapted to be fluidly connected to the valve block housing of a main pump assembly such as that illustrated in FIG. 1. That is, the flat end surface 203 is arranged in confronting relationship with a corresponding surface of a valve block housing such as that diagrammatically illustrated as 30 in FIG. 1. A passage 214 formed through the housing 202 is functionally equivalent to the passage 100 in the FIG. 1 embodiment, interconnecting the charge pump element 204 with a control pressure conduit (such as passage 104 in the FIG. 1 embodiment). A partially threaded bore 216 intersects the through passage 214 and is configured to receive a relief valve 218 of a known design.

A drain passage 220 intersects the bore 216 and is adapted to communicate across the surface 203 with the housing case of the main pump such as is shown schematically in FIG. 1 in the communication provided by the passage 89 between the relief valve 88 and the interior of the housing 28. A centrally located stepped through bore 222 includes a reduced diameter section 223 for mounting a bearing 224 of the auxiliary shaft assembly 212.

The charge pump element 204 comprises a conventional gerotor pumping element consisting of a spacer plate 226, having an axially extending bore 227 formed through it, an external rotor member 228 carried for rotation within the bore 227, and an internal rotor member 230 driving meshing engagement with the external rotor member 228 and drivingly connected to the auxiliary shaft assembly 212 through a key 232 or similar drive means. Discharge of fluid from an outlet chamber 234 formed between the internal and external rotor members 228, 230 is accomplished through the passage 214. External sealing of the charge pump element 204 is effected by seals 236, 238 disposed in grooves 237, 239 formed on the ends 240, 242, respectively of the spacer plate 226.

The auxiliary pump valve housing 206 includes a threaded inlet port 244 adapted to be connected to a fluid supply line such as the conducit 96 of the FIG. 1 schematic. The port 244 intersects an axially extending through passage 246 which interconnects the inlets of the charge pump element 204 and the auxiliary pump element 208. It will be understood by those skilled in the art, however, that fluid may be independently supplied to the two pump elements as by closing the charge pump end of the passage 246 and providing a separate inlet passage in the valve housing 202 such as that designated 205 and illustrated in FIG. 2 as being closed by a plug 207. A discharge passage 248 is also formed in the housing 206 extending axially inwardly from the face 209 of the housing adjacent the auxiliary pump element 208. The passage 248 communicates with a relief valve passage 250 and a check valve passage 252. The passage 250 provides fluid pressure communication with a relief valve 254 of known design, which is in fluid communication with the inlet of the auxiliary pump element 208 in a manner functionally equivalent to that illustrated schematically in FIG. 1 with respect to the relief valve 90. The passage 252 is series connected to a check valve 256 of known design which is fluid communicated with a threaded outlet port 258 which is adapted to be connected to a fluid conduit such as the conduit 110 of FIG. 1 for supplying fluid to an auxiliary motor.

Turning now to FIG. 3, a particular preferred embodiment of a bypass valve 259, such as is shown schematically in FIG. 1 as bypass valve 94, is shown as it is preferably installed in the auxiliary pump valve housing 206. A stepped bore 260 is formed in the housing 206 to define a communication passage 262 intersecting the outlet passage 248, a first valve bore 264, and a second valve bore 266 terminating in a threaded portion 268 receiving a sealing plug 270. First and second spool members 272, 274, respectively, are slideably received in the bores 264, 266 and are urged to the rightward position shown in FIG. 3 by a spring 276 received in a central bore 278 of the second spool member 274 and seated within the sealing plug 270. The first spool member 272 includes a stepped down portion 273 defining an annular chamber 275 with the first bore 264. An orifice 280 is formed in the stepped down portion 273 communicating at its right or inner end with the passage 262 and at its other end with a bore 282 extending axially to the other end of the spool member 272. The length of the first spool member 272 is greater than the length of the first bore 264, thereby spacing the second spool member 274 from the shoulder 284 terminating the second bore 266. A second annular chamber 277 is thereby defined. The second spool member 274 is generally cylindrical and has a circumferentially extending groove 286 formed in its outer periphery to define first and second land portions 288, 290, respectively. A damping orifice 292 traverses the second land portion 290 to provide communication between the annular chamber 277 and the groove 286. A transverse bore 294 extends from the groove 286 to an axially extending through bore 296 which registers with the bore 282 of the first spool member 272. Communication between the first valve bore 264 and a solenoid operated pilot valve 297 of known design equivalent to that shown in FIG. 1 is accomplished through a bore 298. This connection is functionally equivalent to that indicated schematically in passages 116 and 120 in the FIG. 1 schematic. Communication is similarly provided by a bore 300 between the second valve bore 266 and the associated spring chamber 262 and the pilot valve 297, this connection being functionally equivalent to that provided by the passage 122 in FIG. 1.

Also provided in the auxiliary pump valve housing 206 is an axially extending through bore 302 wherein a second bearing 304 (illustrated in FIG. 2 as a pair of needle bearings) providing support for the auxiliary pump shaft assembly 212 is mounted.

Auxiliary pump element 208 is substantially identical to the charge pump element 204. It includes a spacer plate 303 having a pair of annular grooves 304, 306 formed in its end faces to receive seals 308, 310 to provide static fluid sealing between the pump element 208 and the valve housing 206 and the end cover 210. A bore 312 is formed through the spacer plate 303 to receive a wear resistant bushing 314. An external gerotor element 316 is rotatively received in the bushing 314 and is drivingly engaged by an internal gerotor element 318 which is driven by the auxiliary shaft assembly 212 through a key 320 or equivalent drive means. A discharge chamber 322 is conventionally formed between the inner and outer gerotor elements 318, 316 and is fluidly communicated with the outlet passage 248.

Pump elements 204 and 208 may be seen in FIG. 2 as differing in axial length and in the inclusion of the bushing 314 in the auxiliary pump element 208. The former difference is due to an assumed difference in output flow required of the elements, since output flow of the elements is directly proportional to the width of the pumping elements. The latter difference is included to illustrate the known capability of increasing pressure capacity of a gerotor type pump by use of such a bushing.

Turning finally to the end cover 210, it is illustrated as a substantially cylindrical member. A blind centrally located bore 326 is formed in the cover 210 to support a third bearing 328 of the auxiliary shaft assembly 22. Provisions are made to align the bore 326 with bores 223 and 302 to prevent misalignment of the shaft assembly 212, which is adapted as by inclusion of the flatted portion 213 shown to drivingly engage a main pump drive shaft such as shaft portion 32 of FIG. 1. A plurality of bolts 330 extend through holes through radially displaced bosses 332 of the cover 210 and thence through similar holes through the spacer plates 226, 302 and valve housings 202, 206 to threadedly engage a pump valve block such as valve block housing 30 of FIG. 1 to clampingly hold the assembly 200 together.

OPERATION OF THE PREFERRED EMBODIMENT

Referring now to FIG. 1, the invention hydrostatic transmission system 10 can be seen to operate as follows: With the swash plate 50 of the main pump assembly 20 in the position shown, no fluid is displaced as the cylinder barrel 38 is driven by the main shaft portion 32. Upon the creation by the displacement control of a pressure differential between the cavities 72, 74, however, the swash plate 50 is moved pivotally by operation of the control cylinders 56, 58 and their associated linkage arms 60, 62. Since the pistons 48 are moved with the swash plate 50 while the cylinder barrel 38 remains in its axially fixed position against the valve plate 29, reciprocating, pumping movement of the pistons is effected as they are carried rotatively with the cylinder barrel 38. This results in pressurization of one of the discharge passages 44, 46 and the transmittal of pressurized fluid to drive the motor 16 through conduits 15 or 17. Low pressure fluid is returned to the unpressurized passage 44 or 46 through the reverse path. It will hereafter be assumed that the swash plate 50 is positioned to pressurize the conduit 44, it being understood that reverse operation is possible.

Concurrent with the operation described, the auxiliary pump shaft portion 86, which is drivingly connected to the main shaft portion 32 drives the charge pump element 82 of the charge pump assembly 22 to transfer fluid from the system reservoir 9 through the pump element 82 (which may be of the gerotor configuration described in FIG. 2 as charge pump element 204) to the outlet passage 98. Fluid is thereby supplied at a pressure limited by the operation of the relief valve 88 to approximately 200 psig to the displacement control through passages 100 and 104. Control pressure fluid is also supplied from the passage 104 to the check valves 23, 25. With passage 44 pressurized, the ball 23A is urged to a rightward position preventing flow through the check valve 23. Ball 25A of check valve 25 is urged to the position shown in FIG. 1, however; and fluid is allowed to pass through passage 25B of the valve 25 to the passage 46 to maintain the pump inlet pressure at its desired level to prevent cavitation. Control pressure fluid from the outlet passage 98 is further directed to the outer periphery of the auxiliary pump element 84 through the passage 102 and its included orifice 103 to provide lubrication. In a gerotor type element such as illustrated in FIG. 2 as pump element 204, the fluid is supplied to the rubbing interface between the external rotor 316 and the antifriction bushing 314.

Also concurrent with the operation of the main and charge pump assemblies 20, 22, the auxiliary pump assembly 24 is operated by the driving of the auxiliary pump element 84 by the auxiliary pump shaft portion 86. Fluid is supplied from the inlet conduit 96 through the passage 106 (which is equivalent to the passage 246 of FIG. 2) to the inlet of the auxiliary pump element 84 and is thereby delivered to the discharge passage 108. With the bypass valve in its normally open position as shown in FIG. 1, fluid from the discharge passage 108 of the auxiliary pump element 84, is short circuited as fluid is allowed to pass from the passage 108 through the bypass valve 94 and passage 116 to the inlet passage 106. In this mode of operation virtually no power is extracted through the auxiliary pump element 84. Overheating of the fluid during this idling mode is prevented by the advantageous connecting of the inlet of the auxiliary pump element 84 with that of the charge pump element 82, which continually circulates fluid in the main transmission system.

When auxiliary fluid power is required, the normally open solenoid operated pilot valve 95 is closed so that communication between the passage 116 and the spring chamber 128 of the bypass valve portion 93 through passages 120 and 122 is prevented. This results in a buildup of pressure in the chamber 128 as fluid flows from the passage 118 through an orifice 124A in the bypass valve spool 124. When the force exerted by this pressure plus the force of the spring 130 exceeds the opposing pressure force on the annular area on the left end of the spool 124, the spool 124 moves to block the passage 116; and fluid is directed to the auxiliary motor through the check valve 92. The pressure of the fluid supplied is limited during this mode of operation by the relief valve 90.

It will be appreciated by those skilled in the art that the rate at which pressure increases at the outlet of the auxiliary pump element 84 upon closing the solenoid operated pilot valve 95 is largely dependent upon the size of the orifice 124A and the rate of the spring 130 in the embodiment described schematically in FIG. 1. It is necessary to control this rate to a relatively low level to prevent damage to the pump or to the auxiliary motor and associated driven components, and the FIG. 1 embodiment is intended to be illustrative of means that may be employed to meet this need. Other pressure rise rate controlling configurations are possible, however. One configuration utilized by applicant is the incorporation of a dead volume in continuous communication with the spring chamber 128 to attenuate the pressure buildup in that relatively small chamber. Another, particularly advantageous from a manufacturing cost standpoint, is that depicted in FIG. 3.

Turning now to FIG. 3, the bypass valve 259 is illustrated in its closed position wherein communication between the passages 262 and 298 is blocked. When in this position, pressure in the spring chamber 262 is substantially equal to the outlet pressure of the auxiliarly pump element 208. Opening the solenoid operated pilot valve 297 relieves this pressure through the bores 296 and 294, the groove 286, and the passage 300; and the spools 272, 274 shift to the left under the influence of the pressure at the outlet of the auxiliary pump element 208 reflected in the chamber 273 to open the bypass passage 298. Upon reopening the solenoid operated pilot valve 297, flow through the orifice 280 passes through the bores 282, 296, to the spring chamber 262; and the spools 272, 274 move rightward as the pressure builds up. The rate of movement is partly controlled by the rate of flow through the orifice 280. It is further controlled by the rate of flow through the orifice 292 between the annular groove 286 and the chamber 277. Other parameters, such as the rate of the spring 276, also affect the rate of movement and the consequent pressure rise rate as passage 298 is closed by the first spool 272, but is has been found that this pair of orifices so positioned allow easily controlled maintenance of a desirable rate of pressure buildup.

While the invention transmission system has been disclosed in only two embodiments, others are possible without departing from the spirit of the invention.

What is claimed is:

1. In a hydrostatic transmission system of the type including a reservoir; a fluid actuated motor; and a pump assembly comprising a housing assembly, a shaft assembly carried for rotation in the housing assembly, a main pump assembly rotatively driven within the housing assembly by the shaft and fluidly connected to the motor, and a charge pump assembly rotatively driven within the housing assembly by the shaft assembly and fluidly connected at its inlet to the reservoir and at its outlet to the main pump assembly, the improvement wherein:
  A. said pump assembly further comprises an auxiliary pump assembly rotatively driven within said housing assembly by said shaft assembly and having an inlet fluidly connected to said reservoir and an outlet and said system further comprises:
  B. auxiliary hydraulic power takeoff means; and
  C. means for directing the flow of fluid from said outlet of said auxiliary pump assembly, said fluid directing means comprises valve means selectively operable
    1. in one condition to direct fluid to said hydraulic power takeoff means, and
    2. in another condition to direct fluid to said charge pump inlet.

2. The improvement as defined in claim 1 wherein said valve means is carried within said housing assembly and connected fluidly in parallel with said auxiliary pump assembly.

3. The improvement as defined in claim 1 wherein said valve means includes means for controlling the rate at which fluid pressure increases at said auxiliary pump outlet upon selection of said one operating condition.

4. A pump assembly comprising:
  A. a housing assembly;

B. a shaft assembly carried for rotation about its longitudinal axis within said housing assembly and adapted to be connected to a prime mover;

C. a variable displacement main pump assembly within said housing assembly and rotatably driven by said shaft assembly and having a fluid outlet and a fluid inlet;

D. a charge pump assembly within said housing assembly and rotatably driven by said shaft assembly and having an inlet adapted for fluid communication with a fluid reservoir and an outlet connected for fluid communication with said inlet of said main pump assembly;

E. an auxiliary pump assembly within said housing assembly and rotatably driven by said shaft assembly and having an inlet adapted for fluid communication with said reservoir and a fluid flow outlet; and F. valve means selectively operable for directing the flow of fluid from said auxiliary pump assembly in one condition of said auxiliary pump assembly outlet and in another condition to said inlet of said charge pump assembly.

5. The pump as defined in claim 4 further comprising means for controlling the rate at which fluid pressure increases at said auxiliary pump outlet upon selection of said core condition.

6. The improvement as defined in claim 1 wherein the inlet of said auxiliary pump assembly is fluidly connected to the inlet of said charge pump assembly within said housing assembly.

7. The improvement as defined in claim 1 wherein said housing assembly includes a main pump housing subassembly and a charge and auxiliary pump housing subassembly and said shaft assembly includes:

A. a main pump shaft carried for rotation within said main housing subassembly and drivingly connected to said main pump assembly;

B. a charge and auxiliary pump shaft carried for rotation within said charge and auxiliary pump housing subassembly about an axis substantially coincident with the axis of said main shaft and drivingly connected to said charge pump assembly and said auxiliary pump assembly; and C. means for drivingly interconnecting said main pump shaft and said charge and auxiliary pump shaft.

8. The improvement as defined in claim 1 wherein said valve means includes solenoid means for selectively operating said valve means, said solenoid means being energized in said one valve condition and deenergized in said other valve condition.

9. The pump as defined in claim 4 wherein said valve means includes solenoid means for selectively operating said valve means, said solenoid means being deenergized in said one condition and energized in said other condition.

10. A pump transmission system as defined in claim 4 wherein the inlet of said auxiliary pump assembly is fluidly connected to the inlet of said charge pump assembly.

11. A pump transmission system as defined in claim 4 wherein said housing assembly includes a main pump housing subassembly and an auxiliary pump housing subassembly and said shaft assembly includes:

A. a main pump shaft carried for rotation within said main housing subassembly and drivingly connected to said main pump assembly;

B. an auxiliary pump shaft carried for rotation within said auxiliary pump housing subassembly about an axis substantially coincident with the axis of said main shaft and drivingly connected to said charge pump assembly and said auxiliary pump assembly; and C. means for drivingly interconnecting said main pump shaft and said auxiliary pump shaft.

12. A hydrostatic transmission system comprising:

A. a fluid reservoir;

B. a fluid motor adapted to be connected to a load;

C. auxiliary fluid power takeoff means; and

D. a hydraulic pump assembly comprising:
1. a housing;
2. a shaft assembly adapted to be connected to a prime mover and mounted for rotation about its longitudinal axis within said housing;
3. a variable displacement main pump assembly drivingly connected to said shaft for rotation within said housing and having its outlet adapted to be fluidly connected to said fluid motor;
4. a charge pump assembly drivingly connected to said shaft assembly for rotation within said housing and having its inlet adapted to be fluidly connected to said fluid reservoir and its outlet fluidly connected to the inlet of said main pump assembly;
5. an auxiliary pump assembly drivingly connected to said shaft assembly for rotation within said housing and having its inlet fluidly connected to the inlet of said charge pump assembly and its outlet fluidly connected to said auxiliary power takeoff means; and
6. valve means carried within said housing and connected fluidly in parallel with said auxiliary pump assembly and selectively operable:
    a. in one condition to permit the flow of fluid from the outlet of said auxiliary pump assembly to the inlet thereof; and
    b. in another condition to prevent the flow of fluid from the outlet of said auxiliary pump assembly to the inlet thereof,
said valve means including means for controlling the rate at which pressure increases at said auxiliary pump outlet upon selection of said other operating condition.

13. A hydraulic pump assembly comprising:

A. a housing;

B. a shaft adapted to be connected to a prime mover and mounted for rotation about its longitudinal axis within said housing;

C. a main pump assembly within said housing and drivingly connected to said shaft for rotation and having an outlet adapted to be fluidly connected to a hydraulic power takeoff means and an inlet;

D. a charge pump assembly within said housing drivingly connected to said shaft for rotation and having an inlet adapted to be fluidly connected to a source of fluid and an outlet fluidly connected to the inlet of said main pump assembly;

E. an auxiliary pump assembly within said housing drivingly connected to said shaft for rotation and having an inlet adapted to be fluidly connected to the inlet of said charge pump assembly and an outlet adapted to be fluidly connected to another hydraulic power takeoff means; and F. valve means carried within said housing and connected fluidly in parallel with said auxiliary pump assembly and selectively operable:
  1. in one condition to direct the flow of fluid from the outlet of said auxiliary pump assembly to the inlet thereof, and
  2. in another condition to direct the flow of fluid from the outlet of said auxiliary pump assembly to the other hydraulic power takeoff means, said valve means including means for controlling the rate at which pressure increases at said auxiliary pump outlet upon selection of said other operating condition.

14. In a hydrostatic transmission system of the type comprising a fluid reservoir, a fluid motor adapted to be connected to a load, auxiliary fluid power takeoff means, and a main hydraulic pump assembly operatively connected to the fluid motor and including a housing, a shaft assembly adapted to be connected to a prime mover and mounted for rotation within a housing to drive a main pump assembly, the improvement wherein said transmission system further comprises:
  A. an auxiliary pump assembly drivingly connected to said shaft assembly for rotation within said housing and having its inlet adapted to be connected to said reservoir and its outlet adapted to be connected to said auxiliary power takeoff means; and
  B. bypass valve means carried in said housing and comprising:
    1. a first spool member slidably received in a bore formed in said housing for movement between a bypass position wherein flow is permitted between the outlet of said auxiliary pump assembly and the inlet thereof and a blocking position wherein said flow is prevented, thereby directing the outlet flow of said auxiliary pump assembly to said auxiliary power takeoff means, and including an axially extending through passage communicating at one end with the outlet of said auxiliary pump assembly;
    2. a second spool member having a greater cross sectional area than said first spool member; slidably received in a second bore substantially axially aligned with said first bore, biased axially toward said first spool member for movement therewith between said bypass and blocking positions, and defining with said second bore a first chamber at the end thereof remote from said first spool member in fluid communication with said through passage and a second chamber at the other end;
    3. means operative in one condition to permit flow from said first chamber thereby permitting movement of said first spool member to said bypass position and in another condition to prevent flow therefrom thereby effecting increased pressurization of said first chamber and consequent movement of said first spool member to said blocking position;
    4. first orifice means disposed in said through passage for limiting the rate of flow into said first chamber; and
    5. second orifice means fluidly interconnecting said first and second chambers for limiting the rate of flow therebetween;
    said first and second orifice means being thereby effective to limit the rate of travel of said first and second spool members from said bypass to said blocking position and consequently to limit the rate of pressure rise at the outlet of said auxiliary pump assembly.

15. A hydrostatic transmission system according to claim 12 wherein:
  E. said variable displacement main pump assembly has its outlet fluidly connected to the inlet of said fluid motor; and
  F. said fluid motor has an outlet fluidly connected to said inlet of said variable displacement main pump assembly.

* * * * *

UNITED STATES PATENT AND TRADEMARK OFFICE
CERTIFICATE OF CORRECTION

PATENT NO. : 4,041,703

DATED : August 16, 1977

INVENTOR(S) : Kenneth K. Knapp

It is certified that error appears in the above-identified patent and that said Letters Patent are hereby corrected as shown below:

Col. 9, line 27: "core" should read "one".
      line 58: Delete "transmission system".
      line 62: Delete "transmission system".

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*